(12) United States Patent
Schiøtt Johannsen

(10) Patent No.: US 12,338,853 B2
(45) Date of Patent: Jun. 24, 2025

(54) COUPLING FOR INTERCONNECTING TWO ITEMS

(71) Applicant: INNOMONDO APS, Frederiksberg C (DK)

(72) Inventor: Berit Jane Schiøtt Johannsen, Hillerød (DK)

(73) Assignee: TINGHOFF INVEST LTD, London (GB)

( * ) Notice: Subject to any disclaimer, the term of this patent is extended or adjusted under 35 U.S.C. 154(b) by 463 days.

(21) Appl. No.: 17/915,390

(22) PCT Filed: Mar. 31, 2021

(86) PCT No.: PCT/EP2021/058444
§ 371 (c)(1),
(2) Date: Sep. 28, 2022

(87) PCT Pub. No.: WO2021/198337
PCT Pub. Date: Oct. 7, 2021

(65) Prior Publication Data
US 2023/0128857 A1   Apr. 27, 2023

(30) Foreign Application Priority Data
Mar. 31, 2020  (DK) .................................. 2020 00399

(51) Int. Cl.
*F16B 7/04*  (2006.01)
*F16L 37/252*  (2006.01)

(52) U.S. Cl.
CPC ........... *F16B 7/0413* (2013.01); *F16L 37/252* (2013.01)

(58) Field of Classification Search
CPC ....... F16C 37/252; F16C 37/26; F16B 7/0413
See application file for complete search history.

(56) References Cited

U.S. PATENT DOCUMENTS

| 528,816 A | 11/1894 | Smiley |
| 3,162,470 A | 12/1964 | Davidson |

(Continued)

FOREIGN PATENT DOCUMENTS

| EP | 0154111 A2 | 9/1985 |
| FR | 1168602 A | 12/1958 |
| WO | WO 2021/198337 A1 | 10/2021 |

OTHER PUBLICATIONS

International Search Report and Written Opinion of International Searching Authority for International Patent Application No. PCT/EP2021/058444, mailed May 21, 2021 (8 pages).

(Continued)

*Primary Examiner* — Daniel J Wiley
(74) *Attorney, Agent, or Firm* — Nixon Peabody LLP

(57) ABSTRACT

A coupling including a female part attached to one of two items, and a male part attached to the other. The female part has a projection extending only on one side of a plane parallel to a first axis of rotation and away from the end of a circular cylindrical hole and forming a segment of an inner surface. The tap of the male part includes a circular cylindrical proximal end. A groove is arranged in one, and a flange is arranged on the other one of the circular cylindrical inner surface and the proximal end, and the flange and groove are adapted such that the flange can slide in the groove about the first axis of rotation, when the tap is rotated in the hole. The distal end of the tap, in the direction along a second axis of rotation, is longer on one side of the second axis of rotation than on the opposite side.

12 Claims, 4 Drawing Sheets

(56) References Cited

U.S. PATENT DOCUMENTS

Figure 1:
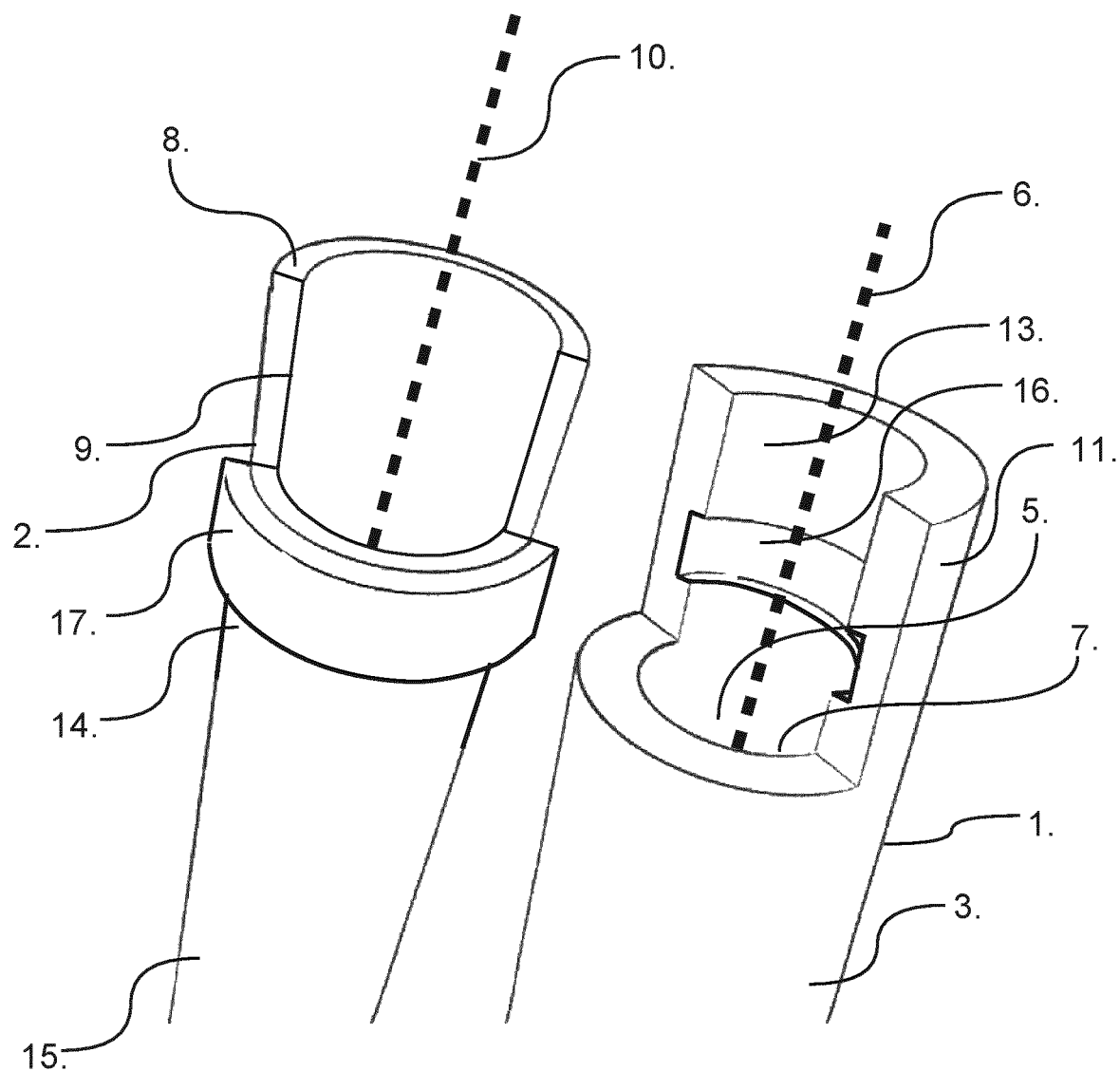

| | | |
|---|---|---|
| 3,413,021 A | 11/1968 | Potts |
| 3,953,057 A | 4/1976 | Petzetakis |
| 6,315,334 B1* | 11/2001 | Garcia ................ F16L 37/252 |
| | | 285/376 |
| 2005/0079010 A1* | 4/2005 | Droppleman ........... F16B 21/04 |
| | | 403/348 |
| 2008/0093846 A1 | 4/2008 | Sparks |
| 2020/0088335 A1* | 3/2020 | Shafer .................. F16L 37/252 |
| 2024/0218947 A1* | 7/2024 | Hudson .................. F16L 55/16 |

OTHER PUBLICATIONS

Danish Patent Office, Search Report for Application No. PA 2020 00399, dated Aug. 14, 2020; English translation not available (5 pages).

* cited by examiner

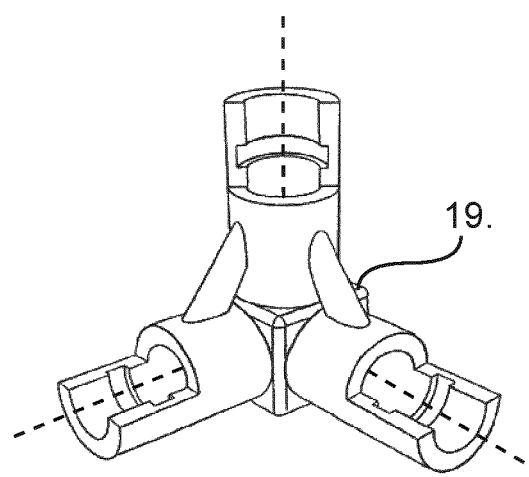
Fig. 5
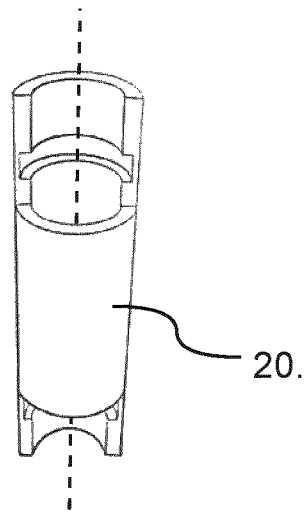
Fig. 6
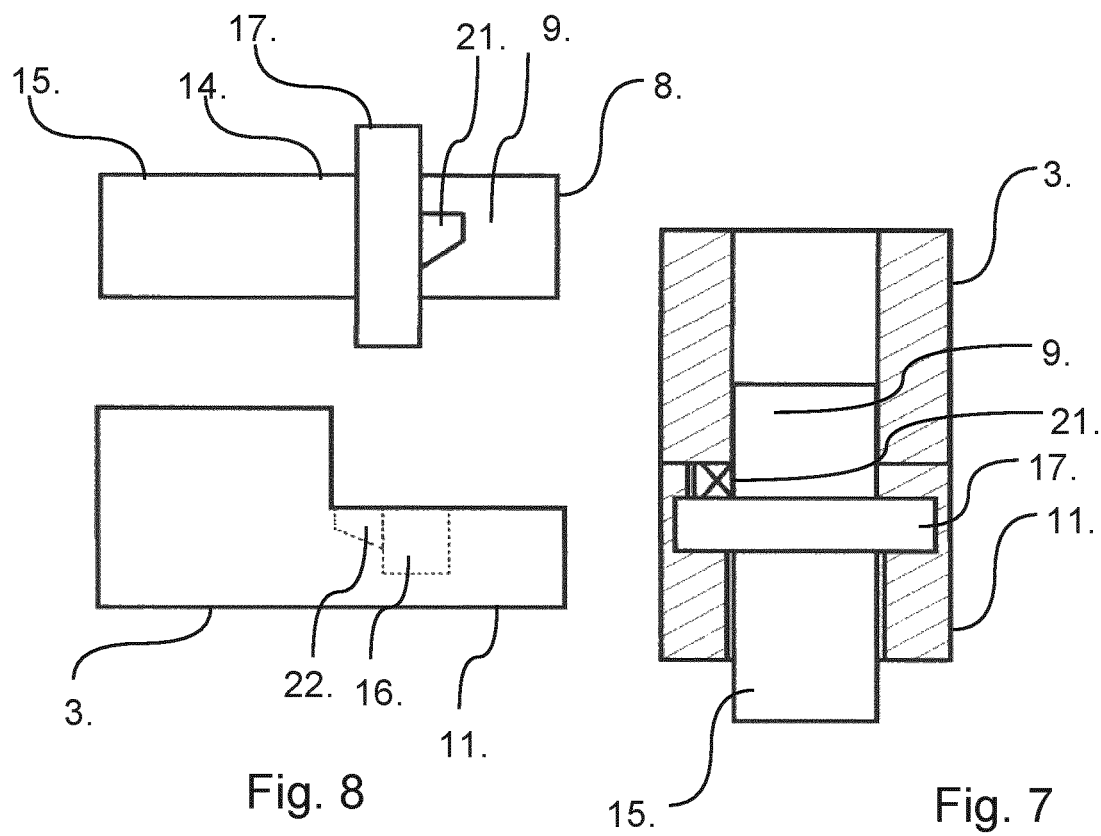
Fig. 8
Fig. 7

COUPLING FOR INTERCONNECTING TWO ITEMS

CROSS-REFERENCE TO RELATED APPLICATIONS

This application is a U.S. National Stage of International Application No. PCT/EP2021/058444, filed Mar. 31, 2021, which claims the benefit of and priority to Denmark Patent Application No. PA 2020 00399, filed Mar. 31, 2020, both of which are incorporated herein by reference in their respective entireties.

PRIOR ART

The present invention relates to releasable interconnecting items, and specifically to items with coupling parts adapted for being releasable interconnected, and where the coupling parts comprises a female part attached to one of the two items, and a male part attached to the other of the two items, and where the female part has a circular cylindrical hole defining a first axis of rotation and having an open end, and the male part comprises a tap with a distal end forming an outer circular cylindrical surface about a second axis of rotation and having a radius corresponding to the circular cylindrical hole where the female part further comprises a projection extending only on one side of a plane parallel to the first axis of rotation and away from the end of the circular cylindrical hole and forming a segment of a circular cylindrical inner surface extending, and the tap of the male part further comprises a circular cylindrical proximal end extending between the distal end and the other of the two items, and where the circular cylindrical proximal end has a radius about the second axis of rotation corresponding to the circular cylindrical inner surface, and where a groove is arranged in one, and a corresponding flange is arranged on the other one of the circular cylindrical inner surface and the circular cylindrical proximal end, and where the flange and the groove are adapted such that the flange can slide in the groove about the first axis of rotation, when the tap is rotated in the circular cylindrical hole.

Couplings of this type are most often used for interconnecting tubular sections and are known in many different embodiments such as disclosed in e.g. U.S. Pat. Nos. 3,413,021; 3,162,470 and US patent application no 2020/0088335 disclosing an irrigation tube system with the above-mentioned features.

Such couplings, however, may also be useful for interconnecting other products or items than tubular sections.

OBJECT OF THE INVENTION

Based on this, it is the object of the present invention to provide a coupling of the type mentioned in the introduction being easy to produce and to connect and disconnect.

According to the present invention, this is achieved by a coupling as mentioned in the introduction and where the distal end of the tap, in the direction along the second axis of rotation, is longer on one side of the second axis of rotation than on the opposite side. Thereby the coupling allows the distal end of the tap to be inserted into the circular cylindrical hole, even if the first and the second axis of rotation of the female part and the male part are misaligned.

By having the projection extending primarily on one side of the first axis of rotation, then strict alignment between the male and female part having the first axis of rotation coinciding with the second axis of rotation, is not necessary in order to provide that the flange can be manipulated into engagement with the groove.

In a preferred embodiment, the groove is arranged in the circular cylindrical inner surface, and the flange is arranged on the circular cylindrical proximal end of the tap.

The radius of the circular cylindrical hole may preferably the same as the radius of the circular cylindrical inner surface.

The coupling is especially easy to assemble in an embodiment where the projection extends only on one side of a plane extending through the first axis of rotation.

In this relation, the flange may preferably extend half way or less than half way around the circular cylindrical proximal end of the tap.

The coupling according to the invention may also be provided for transmitting torque from between the male part and the female part when the groove or the flange has an end stop preventing the flange from sliding completely through the groove from one end of the groove to the other.

In another embodiment the flange may extend completely around the circular cylindrical proximal end of the tap The tap may be solid, but especially in relation to the use of the coupling for interconnecting tubular sections, it may form a tube having a through hole extending along the second axis of rotation, so that the tap forms an end of the tubular section.

In this relation, the female part may also form the end of a tubular section having a circular cylindrical outer surface extending about the first axis of rotation.

The drawing:

FIG. 1: Is a principle drawing showing an embodiment of a coupling for interconnecting two items.

Figure 2:
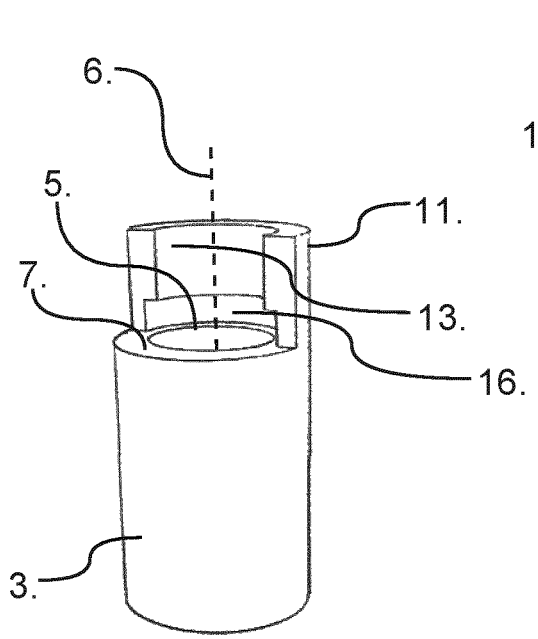

FIG. 2: Is a principle drawing showing an embodiment of a female part of the coupling according to the invention.

Figure 3:
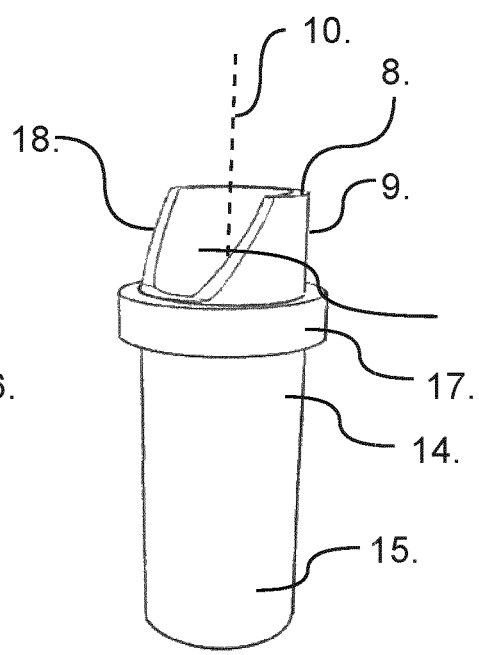

FIG. 3: Is a principle drawing showing an embodiment of a male part of the coupling according to the invention.

Figure 4:
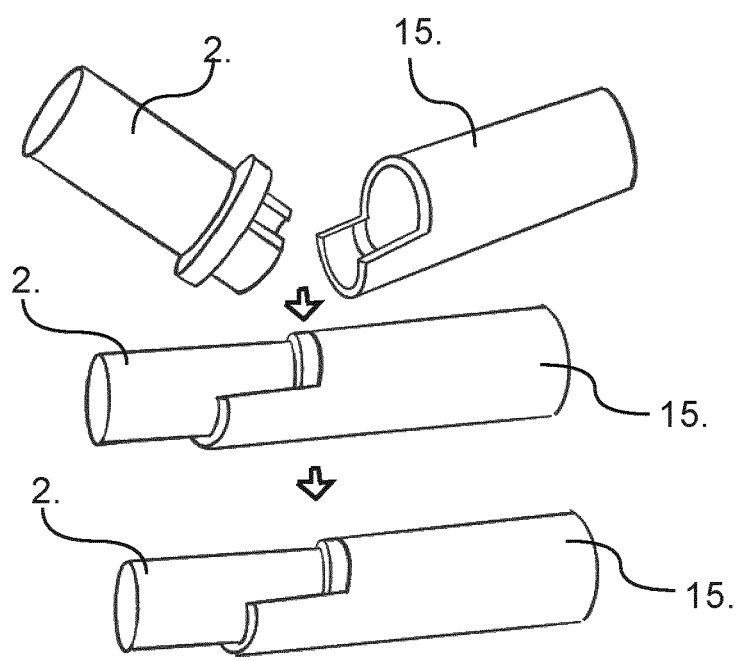

FIG. 4: Is an illustration showing the steps of interconnecting the female and the male parts as shown in FIGS. 1, 2 and 3.

FIG. 5: is a perspective principle drawing showing a product with three female parts of the coupling according to the invention.

FIG. 6: is a perspective drawing showing a tube section having each end provided with a female part of the coupling according to the invention.

FIG. 7: is a principle drawing showing a female part and a male part of the coupling according to the invention as well as a cross section showing an assembly of the female and the male part that is provided with an end stop.

FIG. 8: is a principle drawing showing alternative embodiment of the female part shown in FIG. 1 provided with an end stop.

Figures 9, 10:
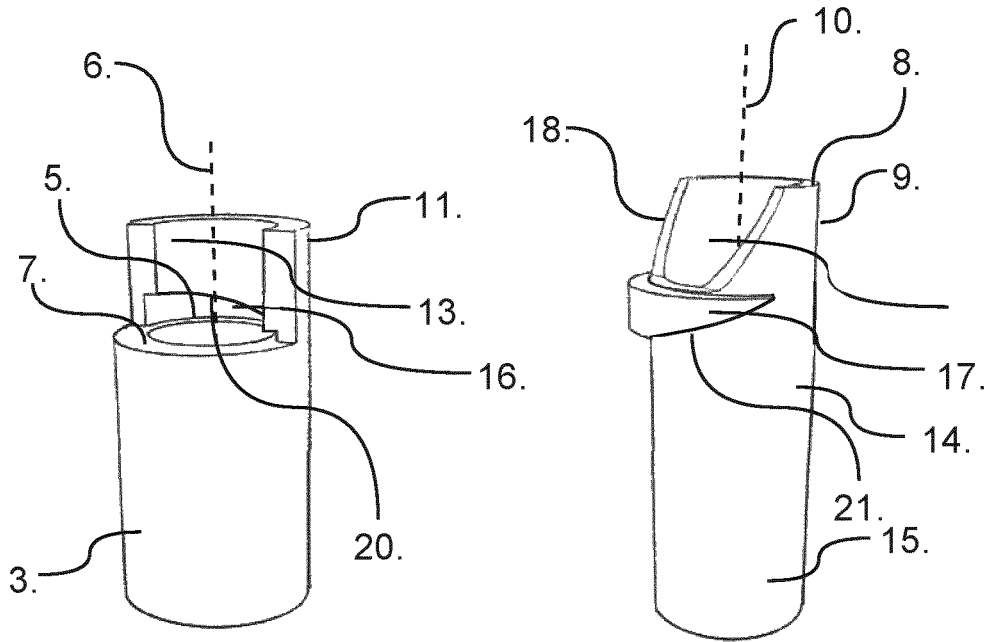

FIG. 9: Is a principle drawing showing an alternative embodiment of a female part of the coupling according to the invention.

FIG. 10: Is a principle drawing showing an embodiment of a male part of the coupling according to the invention.

DESCRIPTION OF AN EMBODIMENT

Embodiments of the present invention will be explained in principle in the following with reference to the embodiments shown in the drawings illustrating the design and utility of such embodiments, in which similar elements are referred to by common reference numerals. The drawings depict only exemplary embodiments and are not therefore to be considered limiting in the scope of the claims. The drawings may or may not be drawn to scale. In addition, an illustrated embodiment needs not have all the aspects or advantages shown. An aspect or an advantage described in conjunction with a particular embodiment is not necessarily limited to that embodiment and can be practiced in any other examples even if not so illustrated, or if not so explicitly described.

FIG. 1 now shows two items 3, 15 in the form of tubes. The one item 3 has a female part 1 of the coupling attached at the end and the other item 15 has a male part 2 of the coupling also attached at its end.

In this embodiment, the female part 1 has a circular cylindrical hole 5 extending around its axis of rotation 6, and the male part 2 of the coupling has a tap with a distal end 8 having an outer circular cylindrical surface 9. The radius of the outer circular cylindrical surface 9 corresponds to the radius of the circular cylindrical hole 5, so that the distal end 8 of the tap may be inserted into the circular cylindrical hole 5 and rotate in it.

The female part 1 further has a projection 11 extending from the end 7 of the circular cylindrical hole 5 and the projection carries a part of a circular cylindrical inner surface 13 that extends only on one side of the axis of rotation 6 so that it form a circular cylindrical half pipe. The circular cylindrical surface 9 has a groove 16 extending, and the proximal end 14 of the tap has a complementary shaped flange 17 that can slide in the groove 16 when the distal end of the tap is rotated in the circular cylindrical hole 5. The two items 3, 15 can thereby be interconnected by first sliding the distal end 8 of the tap into the circular cylindrical hole 5 when the flange 17 is held at the opposite side of the circular cylindrical hole as the projection 11. Thereafter, when the flange 17 is aligned with the groove 16, the item 15 is rotated with respect to the item 3 so that the flange 17 slides into engagement in the groove 16. This assembly process is also illustrated in FIG. 4.

FIGS. 2 and 3 discloses an embodiment according to the present invention being almost identical to the one disclosed in FIG. 1 apart from the distal end 8 of the tap having a oblique cut off 18 section so that the distal end 8. of the tap, in the direction along the second axis of rotation 10, is longer on one side of the second axis of rotation 10 than on the opposite side. The embodiments shown in FIGS. 1, 2 and 3 are thereby easy to insert the distal end 8 of the tap such as it is illustrated in FIG. 4, and into the circular cylindrical hole 5 due to the fact that this does not require alignment of the two items 3, 15 to have the first axis of rotation 6 coinciding with the second axis of rotation 10.

FIG. 3 also shows that the flange 17 extends all the way around the tube 15 and forms a complete ring. This provides a safe connection between the two items 3 and 15. However, the flange 17 may alternatively extend partly around the tube 15 and even halfway or less than halfway around it.

In FIG. 3 the groove 16 is arranged closer to the end 7 of the circular cylindrical hole 5 than the corresponding groove 16 in FIG. 1. In practice this distance may be selected as a compromise between providing the easiest assembly on the one hand, and providing a tight closure between the female part 1 and the male part 2. The closer the groove 16 is to the end 7 of the circular cylindrical hole 5 the tighter the fit is between the female part 1 and the male part 2, but a longer distance provides an easier assembly.

FIG. 5 shows another embodiment of the present invention where a cube 19 has three female parts attached to neighboring sides of the cube 19, The female parts may be interconnected with any of the male parts 2 in FIG. 1 or 3 in the same manner as shown in FIG. 4

FIG. 6 shows still another embodiment where a tubular section 20 has one female parts attached on each end. It is clear to the skilled person that any of the female parts shown in FIGS. 5 and 6 may be replaced with a male part depending on the selected functionality.

In all the above-mentioned figures, the flange 17 is possible to slide all the way through the groove 16, so that these assemblies are free to be mutually rotated in any direction. FIG. 7 shows in this relation that the male part 15 can have an end stop 21 arranged next to the flange 17, so that the end stop 21 engages with a socket 22 arranged next to the groove 16 on the female part 3. Thereby further mutual rotation of the male part 16 and the female part is prohibited in one direction, so that the assembly can transfer torque between the female part and the male part.

Alternatively, as shown in FIG. 8 the end stop 23 may be provided by closing one end of the groove 16, but it will be apparent to the skilled person that such an end stop may be provided in other ways than what is shown in FIGS. 7 and 8.

Furthermore in any of the embodiments above the grooves 16 and flanges 17 extend in a plane perpendicular to the axis of rotation 6 and the second axis of rotation, but alternatively these grooves 16 and these flanges 17, or at least parts of the grooves 16 and the flanges 17 such as one side face or one end of the grooves 16 and the flanges 17 may be shaped like a helix so that the grooves 16 and the flanges 17 forms a part of a screw thread. Thereby mutual rotation of the male part with respect to the female part, when the groove 16 is in engagement with the flange 17, provides that the two parts be forcibly moved with respect to each other, along the axis of rotation.

FIGS. 9 and 10 shows an embodiment of such a coupling corresponding to the embodiment shown in FIGS. 2 and 3, but where a side faces 20 and 21 of the groove 16 and flange 17 respectively are shaped to be helical so that when assembling the coupling the two parts the helical side faces 20, 21 forces them to a secure engagement.

From the description above, it will be apparent to the skilled person that the present invention may be implemented in many different embodiments apart from the embodiment shown in the figures. Furthermore, the coupling is easy to produce in any material thanks to its simple design. It may therefore be made from any plastic, metal, ceramic or concrete material by e.g. molding, casting, machining, or additive manufacturing, and as such, it may be used for producing many different products, such as tent poles, water or sewer pipes, grid structures, drills or screwdriver bits. Although none of the drawings shows gaskets or seals then it will be apparent to the skilled person that such gasket or seals may be used at various positions of coupling depending on the use of the coupling.

The invention claimed is:

1. A coupling for interconnecting two items, the coupling comprising a female part attached to one of the two items, and a male part attached to the other of the two items, and where the female part has a circular cylindrical hole defining a first axis of rotation and having an open end, and the male part has a tap with a distal end forming an outer circular cylindrical surface about a second axis of rotation and having a radius corresponding to the circular cylindrical hole, and where the female part further includes a projection extending only on one side of a plane parallel to the first axis of rotation and away from the end of the circular cylindrical hole and forming a segment of a circular cylindrical inner surface, and the tap of the male part further includes a circular cylindrical proximal end extending between the distal end and the other of the two items, and where the circular cylindrical proximal end has a radius about the second axis of rotation corresponding to the circular cylindrical inner surface, and where a groove is arranged in one, and a corresponding flange is arranged on the other one, of the circular cylindrical inner surface and the circular cylindrical proximal end, and where the flange and the groove are adapted such that the flange can slide in the groove about the first axis of rotation, when the tap is rotated in the circular cylindrical hole, wherein the distal end of the tap, in the direction along the second axis of rotation, is longer on one side of the second axis of rotation than on the opposite side.

2. A coupling according to claim 1, wherein the groove is arranged in the circular cylindrical inner surface, and the flange is arranged on the circular cylindrical proximal end of the tap.

3. A coupling according to claim 2, wherein the radius of the circular cylindrical hole is the same as the radius of the circular cylindrical inner surface.

4. A coupling according to claim 2, wherein the projection extends only on one side of a plane extending through the first axis of rotation.

5. A coupling according to claim 1, wherein the radius of the circular cylindrical hole is the same as the radius of the circular cylindrical inner surface.

6. A coupling according to claim 1, wherein the projection extends only on one side of a plane extending through the first axis of rotation.

7. A coupling according to claim 6, wherein the flange extends half way or less than half way around the circular cylindrical proximal end of the tap.

8. A coupling according to claim 7, wherein the groove or the flange has an end stop preventing the flange from sliding completely through the groove from one end of the groove to the other.

9. A coupling according to claim 6, wherein the flange extends completely around the circular cylindrical proximal end of the tap.

10. A coupling according to claim 1, wherein the tap forms a tube having a through hole extending along the second axis of rotation.

11. A coupling according to claim 1, wherein the female part forms a tube that has a circular cylindrical outer surface extending about the first axis of rotation.

12. A coupling according to claim 1, wherein at least a part of the groove and the flange forms a helix around the axis of rotation and the second axis of rotation respectively.

* * * * *